US011257399B2

(12) United States Patent
Tanaka et al.

(10) Patent No.: US 11,257,399 B2
(45) Date of Patent: Feb. 22, 2022

(54) DECODING APPARATUS, DECODING METHOD, AND PROGRAM

(71) Applicant: NEC Corporation, Tokyo (JP)

(72) Inventors: Yuki Tanaka, Tokyo (JP); Isamu Teranishi, Tokyo (JP); Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 16/468,346

(22) PCT Filed: Dec. 12, 2016

(86) PCT No.: PCT/JP2016/086924
§ 371 (c)(1),
(2) Date: Jun. 11, 2019

(87) PCT Pub. No.: WO2018/109809
PCT Pub. Date: Jun. 21, 2018

(65) Prior Publication Data
US 2019/0347962 A1  Nov. 14, 2019

(51) Int. Cl.
*H04L 9/30* (2006.01)
*G09C 1/00* (2006.01)
(Continued)

(52) U.S. Cl.
CPC .......... *G09C 1/00* (2013.01); *H03M 13/3738* (2013.01); *H04L 1/0047* (2013.01);
(Continued)

(58) Field of Classification Search
CPC .... G09C 1/00; H03M 13/3738; H04L 1/0047; H04L 1/0076; H04L 1/0054; H04L 9/3073; H04L 9/3039
See application file for complete search history.

(56) References Cited

U.S. PATENT DOCUMENTS 4,933,956 A    6/1990  Forney
8,566,601 B1 * 10/2013  Waters ................ H04L 9/3073
                                                            713/182
(Continued)

FOREIGN PATENT DOCUMENTS

JP    2005-217871 A        8/2005
JP    2005217871 A  *     8/2005
(Continued)

OTHER PUBLICATIONS

Ma et al, Design of a Lattice Decoder for MIMO Systems in FPGA, 2004, IEEE, pp. 24-29. (Year: 2004).*
Written Opinion in International Application No. PCT/JP2016/086924, dated Mar. 14, 2017.
International Search Report in International Application No. PCT/JP2016/086924, dated Mar. 14, 2017.
(Continued)

*Primary Examiner* — Lynn D Feild
*Assistant Examiner* — Abdullah Almamun
(74) *Attorney, Agent, or Firm* — Sughrue Mion, PLLC (57) ABSTRACT

A decoding apparatus includes a plurality-of-bits decoding part configured to receive an input vector obtained by adding a message encrypted by a trapdoor function and an error vector including an element(s) conforming with a discrete Gaussian distribution, and decode a plurality of bits from a lower bit of the message based on the input vector in correctness with a predetermined probability; and a confirmation calculation part configured to determine in parallel whether the decoded plurality of bits are correct or not, wherein the message is encrypted by taking an inner product with a vector including a power of two as an element(s).

12 Claims, 9 Drawing Sheets

(51) Int. Cl.
*H03M 13/37* (2006.01)
*H04L 1/00* (2006.01)
(52) U.S. Cl.
CPC .......... *H04L 1/0076* (2013.01); *H04L 9/3093* (2013.01); *H04L 1/0054* (2013.01)

(56) References Cited

U.S. PATENT DOCUMENTS

| | | | |
|---|---|---|---|
| 2012/0155635 A1* | 6/2012 | Vaikuntanathan | H04L 9/0894 380/44 |
| 2012/0207299 A1* | 8/2012 | Hattori | H04L 9/3073 380/30 |
| 2016/0355043 A1* | 12/2016 | Pokorny | B42D 25/30 |
| 2019/0103957 A1* | 4/2019 | Isobe | G09C 1/00 |

FOREIGN PATENT DOCUMENTS

| | | |
|---|---|---|
| JP | 2011-2810 A | 1/2011 |
| JP | 2013217970 A * | 10/2013 |

OTHER PUBLICATIONS

Daniele Micciancio, et al., "Trapdoors for Lattices: Simpler, Tighter, Faster, Smaller", EUROCRYPTO, Sep. 14, 2011, p. 1-41 (41 pages total).

Daniele Micciancio, et al., "Trapdoors for Lattices: Simpler, Tighter, Faster, Smaller", Lecture Notes in Computer Science, 2012, pp. 700-718, vol. 7237 (19 pages total).

Daniele Micciancio, et al., "Efficient Bounded Distance Decoders for Barnes-Wall Lattices", IEEE International Symposium on Information Theory, Jun. 2008, pp. 2484-2488 (5 pages total).

* cited by examiner

BIT REPRESENTATION OF $b_{K-|t|-L} - 2^{K-|t|-L}t \mod 2^K$

WHERE, $t = m_{0,0} + 2m_{0,1} + \ldots + 2^{|t|-1}m_{0,|t|-1}$ $b_{K-|t|-L} = 2^{K-|t|-L}(m_{0,0} + \ldots + 2^{|t|-1}m_{0,|t|-1} + 2^{|t|}m_{0,|t|} + \ldots + 2^{|t|+L-1}m_{0,|t|+L-1}) + \epsilon_{K-|t|-L}$ IN CASE WHERE $\epsilon_{K-|t|-L}$ IS WITHIN THIS RANGE, $m_{0,|t|}, \ldots, m_{0,|t|+L-1}$ CAN BE DECODED

DECODING APPARATUS, DECODING METHOD, AND PROGRAM

TECHNICAL FIELD

This application is a National Stage Entry of PCT/JP2016/086924 filed on Dec. 12, 2016, the contents of all of which are incorporated herein by reference, in their entirety.

The present invention relates to a decoding apparatus, a decoding method, and a program, and more particularly to a decoding apparatus, a decoding method, and a program for a trapdoor function used for lattice cryptography and signatures.

BACKGROUND

A trapdoor function is a procedure including a key generation process, a function calculation process, and an inverse function calculation process, and is used particularly for public key cryptography and signatures. Earnest studies are being made on cryptography using lattices (lattice cryptography) and signatures in view of efficiency based on simplicity of calculations, homomorphism resulting from linearity of basic calculations, and security demonstrated by non-discovery of attacks by quantum computers.

Non-Patent Literature 1 describes a typical method for configuring the trapdoor function for lattice cryptography and signatures.

Now, the method for configuring the trapdoor function in Non-Patent Literature 1 will be described in detail. Note that Non-Patent Literature 1 and the present invention assume that calculations are executed using $$\mathbb{Z}_q = \mathbb{Z}/q\mathbb{Z}$$

(hereinafter also denoted by $Z_q=Z/qZ$) where q is an integer of power of two, $q=2^k$ (K is a natural number).

First, a "primitive lattice matrix" that plays an important role in the configuration method in Non-Patent Literature 1 will be described below. A primitive lattice matrix G is a matrix represented by $$G = \begin{bmatrix} \vec{g} & \cdots & 0 \\ \vdots & \ddots & \vdots \\ 0 & \cdots & \vec{g} \end{bmatrix}$$

where a vector:

$$\vec{g} = (1, 2, \ldots, 2^{K-1})$$

(hereinafter also denoted as g) is a vector including a power of two as an element. The primitive lattice matrix G is used to execute a key generation process, a function calculation process, and an inverse function calculation process. Specific contents of the (1) key generation process, the (2) function calculation process, and the (3) inverse function calculation process will be described.

(1) Key Generation Process

In Non-Patent Literature 1, the key generation process is configured as described below. The key generation process uses $N \in Z$ as a security parameter and receives a parameter:

$$\text{param} = (K, N, q=2^K, \overline{M}=O(NK), M=\overline{M}+NK, \sigma=\omega(\sqrt{\log N}, \alpha))$$

as an input. Moreover, the key generation process outputs a matrix used as a "public key" and a matrix used as a "trapdoor" (or a "secret key"). Here, O and ω are Landau symbols. Moreover, α is a number satisfying $$\frac{1}{\alpha} > \sigma \cdot \omega(\sqrt{\log N}).$$

First, a procedure for generating a public key will be described.
The public key is configured as a matrix:

$$A = (\overline{A} | \overline{A}R + HG),$$

where each component is $Z_q$. Here, a notation (E|F) denotes two matrices E and F arranged side by side.
Moreover, a matrix:

$$\overline{A}$$

is obtained by uniform sampling from $$\mathbb{Z}_q^{N \times \overline{M}}.$$

Furthermore, the matrix H is a regular matrix of $Z_q^{N \times N}$. Moreover, a matrix:

$$R \in \mathbb{Z}^{\overline{M} \times NK}$$

includes column vectors generated from a discrete Gaussian distribution on $$\mathbb{Z}^{\overline{M}}$$

with a variance value σ described below. Here, the "discrete Gaussian distribution on $Z^N$ with a variation value σ" refers to a distribution obtained by outputting an integer value:

$$u \in \mathbb{Z}^N$$

at a probability:

$$\phi(u) \bigg/ \sum_{j=-\infty}^{\infty} \phi(j)$$

using a function:

$$\phi(x) := \frac{1}{\sigma} \exp\left(-\frac{\pi}{\sigma^2}|x|^2\right)$$

determined by a real number:

$$\sigma \in \mathbb{R}$$

Such a discrete Gaussian distribution is hereinafter represented as $D_Z^N$, σ.
In the key generation process, a public key A and a matrix R used as a trapdoor (or a secret key) are finally output.

(2) Function Calculation Process

The function calculation process includes receiving, as an input, the public key A and the parameter param generated as described above, and a vector:

$$\vec{m} = (m_0, \ldots, m_{N-1}) \in \mathbb{Z}_q^N$$

(hereinafter also denoted as m) corresponding to a message. The function calculation process also includes taking $$\vec{e} \in D_{\{\mathbb{Z}^M, \alpha q\}}$$

(hereinafter also denoted as e) from the discrete Gaussian distribution and outputting a vector:

$$\vec{c} = \vec{m}A + \vec{e} \in \mathbb{Z}_q^M$$

(hereinafter also denoted as c).

(3) Inverse Function Calculation Process

The inverse calculation process includes receiving, as an input, the vector c generated in the function calculation process. Then, a matrix:

$$\begin{pmatrix} -R \\ I \end{pmatrix}$$

is applied on the vector c from the right. Here, a result of application of the above-described matrix on the vector c is represented as a vector b. At this time, the vector b is as follows:

$$\vec{b} = \vec{c} \binom{-R}{I} = (m(\overline{A}|\overline{A}R+HG) + \vec{e}) \binom{-R}{I} = \vec{m}HG + \vec{e} \binom{-R}{I} = \vec{m}HG + \vec{\epsilon}.$$

Note that, on the rightmost side, the following relationship is given:

$$\vec{\epsilon} = \vec{e} \binom{-R}{I}.$$

In other words, the vector b is data obtained by adding mH encoded by the primitive lattice matrix G and an error vector:

$$\vec{\epsilon} = (\epsilon_0, \ldots, \epsilon_{NK-1})$$

(hereinafter represented as ε). Here, it is noted that components of the error vector ε are substantially definitely included within a range $(-q/4, q/4]$ by taking, from an appropriate distribution, the matrix R, which is a secret key, and the vector e. In other words, the probability at which each component of the error vector ε is outside the range $(-q/4, q/4]$ is negligible. Accordingly, a determined vector mH allows the message m to be determined by applying an inverse matrix $H^{-1}$ from the right. The present invention relates to a process of decoding mH from the vector b, and thus, generality is not lost even in a case where the matrix H is a unit matrix. Thus, in the following, description is given assuming that the matrix H is a unit matrix.

From above, the decoding process for the message m results in an error correction process for the vector b. Thus, a procedure for decoding the message m from the vector b using the error correction process will be described below in detail.

The error correction is executed for each component $m_i$ (i=0, ..., N−1) of the message $m = (m_0, \ldots, m_{N-1})$. Thus, only the decoding process for the first component $m_0 \in Z_q$ of the message will be described below. This is because the other components $m_1, \ldots, m_{N-1}$ of the message m can be decoded similarly to the first component $m_0$. Furthermore, also for the vector b, only the first K components $(b_0, \ldots, b_{K-1})$ related to decoding of the first component $m_0$ of the message m are focused on.

It is hereinafter assumed that the first component $m_0$ of the message m is represented by $$m_0 = 2^0 m_{0,0} + 2^1 m_{0,1} + 2^2 m_{0,2} + \ldots + 2^{K-1} m_{0,K-1}$$

when expanded into bits. The error correction process described in Non-Patent Literature 1 is as follows.

"Error Correction (Step A1) in Non-Patent Literature 1"

The K-th component of the vector b is $$b_{K-1} = 2^{K-1} m_{0,0} + \epsilon_{K-1} \in \mathbb{Z}_q.$$

Here, the component of the error vector satisfies $$\epsilon_{K-1} \in \left(-\frac{q}{4}, \frac{q}{4}\right],$$

and thus, the lowest bit (first bit on the lower side) $m_{0,0}$ of the first component $m_0$ of the message m can be uniquely decoded.

"Error Correction (Step A2) in Non-Patent Literature 1"

Next, the (K−1)-th component of the vector b is:

$$b_{K-2} = 2^{K-2} m_{0,0} + 2^{K-1} m_{0,1} + \epsilon_{K-2} \in \mathbb{Z}_q.$$

Here, $m_{0,0}$ is already decoded (is known) in step A1, and the component of the error vector is:

$$\epsilon_{K-2} \in \left(-\frac{q}{4}, \frac{q}{4}\right]$$

and thus, the second lowest bit $m_{0,1}$ of the first component $m_0$ can be decoded.

"Error Correction (Step A3) in Non-Patent Literature 1"

Subsequently, all the bits $(m_{0,0}, \ldots, m_{0,K-1})$ of the first component $m_0$ of the message m are similarly decoded.

The inverse function calculation process in Non-Patent Literature 1 has been described above.

In Non-Patent Literature 1, a trapdoor function is configured by executing such key generation process, function calculation process, and inverse function calculation process.

As the related art, Patent Literature 1 describes an arithmetic decoding apparatus executing a decoding process on a plurality of bits at a time.

Patent Literature 1: Japanese Patent Application Laid-Open No. 2005-217871

Non-Patent Literature 1: Daniele Micciancio, Chris Peikert, "Trapdoors for Lattices: Simpler, Tighter, Faster, Smaller," [online], Sep. 14, 2011, EUROCRYPTO 2012, pp. 700-718, [searched on Nov. 17, 2016], Internet <URL: http://eprint.iacr.org/2011/501>

SUMMARY

All of the contents disclosed in Patent Literature 1 and Non-Patent Literature 1 are incorporated herein by reference. The analysis below has been performed by the present inventors.

The decoding process in Non-Patent Literature 1 needs bit decoding processes executed K times to decode a message with K bits. In other words, the decoding process in Non-Patent Literature 1 needs the bit-wise sequential decoding process described in "Error Correction (Steps A1 to A3) in Non-Patent Literature 1". This disadvantageously precludes an increase in processing speed based on parallel processing.

Note that the arithmetic decoding apparatus described in Patent Literature 1 determines whether a decoding process can be executed on a plurality of bits at a time or not, and in a case where the determination is affirmative, executes a batch decoding process. Thus, the arithmetic decoding apparatus in Patent Literature 1 does not contribute to solving the above-described problem with Non-Patent Literature 1.

Thus, a challenge is to allow the decoding process with the trapdoor function to be executed faster. An object of the present invention is to provide a decoding apparatus, a decoding method, and a program that contribute to solving such a problem.

A decoding apparatus according to a first aspect of the present invention includes: a plurality-of-bits decoding part configured to receive an input vector obtained by adding a message encrypted by a trapdoor function and an error vector including an element(s) conforming with a discrete Gaussian distribution, and decode a plurality of bits from a lower bit of the message based on the input vector in correctness with a predetermined probability; and a confirmation calculation part configured to determine in parallel whether the decoded plurality of bits are correct or not, wherein the message is encrypted by taking an inner product with a vector including a power of two as an element(s).

A decoding method according to a second aspect of the present invention includes, performed by a computer: receiving an input vector obtained by adding a message encrypted by a trapdoor function and an error vector including an element(s) conforming with a discrete Gaussian distribution; decoding a plurality of bits from a lower bit of the message based on the input vector in correctness with a predetermined probability; and determining, in parallel, whether the decoded plurality of bits are correct or not, wherein the message is encrypted by taking an inner product with a vector including a power of two as an element(s).

A program according to a third aspect of the present invention causes a computer to execute processes of: receiving an input vector obtained by adding a message encrypted by a trapdoor function and an error vector including an element(s) conforming with a discrete Gaussian distribution; decoding a plurality of bits from a lower bit of the message based on the input vector in correctness with a predetermined probability; and determining in parallel whether the decoded plurality of bits are correct or not wherein the message is encrypted by taking an inner product with a vector including a power of two as an element(s). The program may be provided as a program product recorded in a non-transitory computer-readable storage medium.

According to the decoding apparatus, the decoding method, and the program according to the present invention, the speed of the decoding process for the trapdoor function can be increased.

PREFERRED MODES

First, an outline of one example embodiment will be described. Note that the reference signs in the drawings added in this outline are given solely for the sake of better understanding, and are not intended to limit the present invention to the illustrated aspect.

Figure 1:
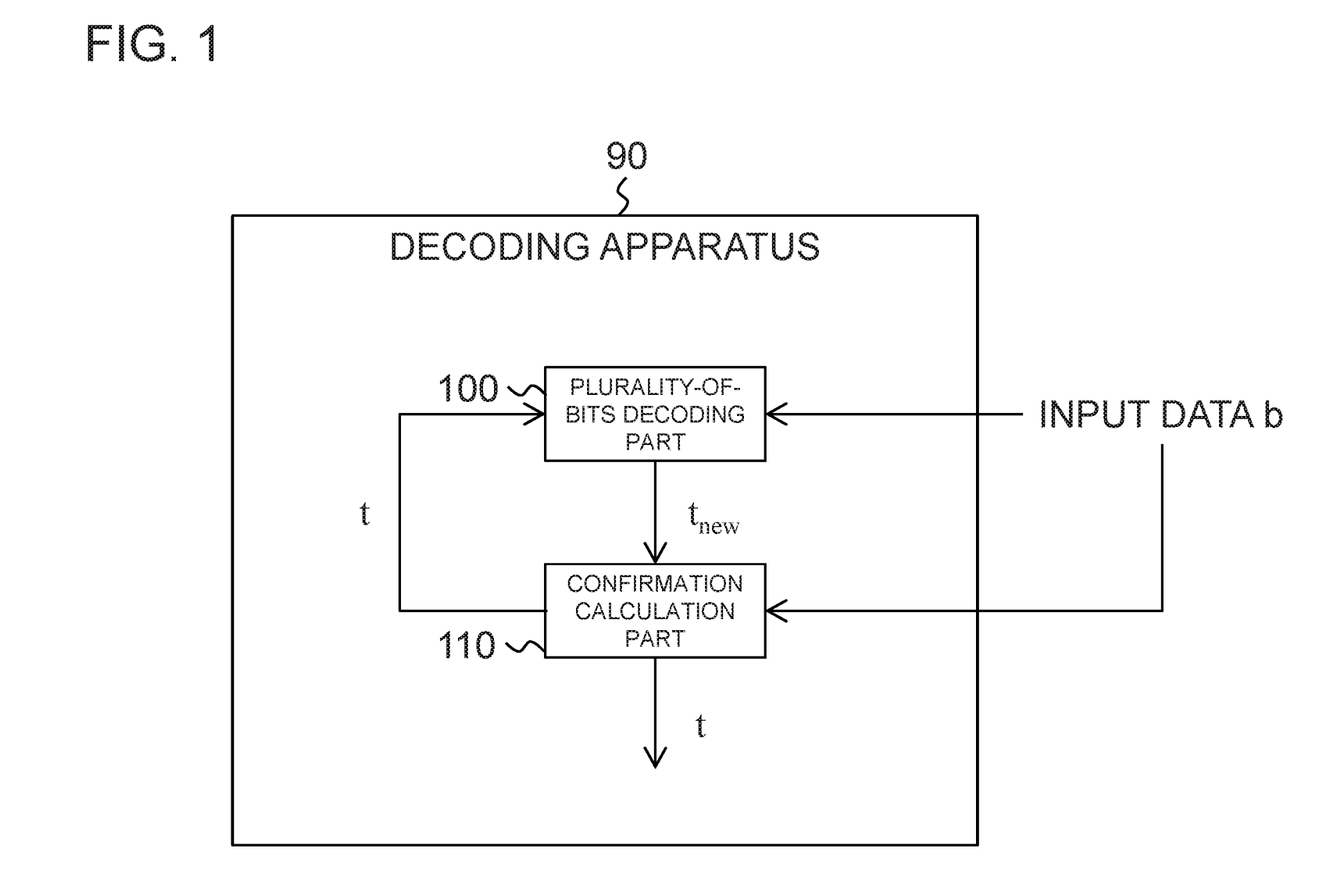
FIG. 1 is a block diagram illustrating an example of a configuration of a decoding apparatus according to one example embodiment.

As seen in FIG. 1, a decoding apparatus 90 according to one example embodiment includes a plurality-of-bits decoding part 100 and a confirmation calculation part 110. The plurality-of-bits decoding part 100 receives an input vector (for example, the above-described vector b) obtained by adding a message (for example, the above-described message m) to be encrypted by a trapdoor function, the message being encoded by taking an inner product with a vector (for example, the above-described vector $g=(1, 2, \ldots, 2^{K-1})$) including a power of two as an element(s), and an error vector (for example, the above-described error vector $\varepsilon$) including an element(s) conforming with a discrete Gaussian distribution. Moreover, the plurality-of-bits decoding part 100 further correctly decodes, at a predetermined probability (for example, the probability at which a component $\varepsilon_{K-L}$ of the error vector $\varepsilon$ is included within a predetermined range described below), a plurality of bits (for example, L bits $m_{0,0}, \ldots, m_{0,L-1}$ from a lower side when the first component $m_0$ of the message m is expanded into bits) from the lower side of the message (for example, the first component $m_0$ of the message m), based on the input vector (for example, the (K−L+1)-th component $b_{K-L}$ of the vector b). Furthermore, the confirmation calculation part 110 determines in parallel whether the decoded plurality of bits are correct or not.

The error correction (steps A1 to A3) in Non-Patent Literature 1 includes sequentially decoding a plurality of bits ($m_{0,0}, \ldots, m_{0,K-1}$) constituting a message (for example, the first component $m_0$ of the message m) to decode the message while allowing basically no errors to be included in decoded bits. On the other hand, in the decoding apparatus according to the one example embodiment, when a plurality of bits (for example, L bits $m_{0,0}, \ldots, m_{0, L-1}$) constituting a message (for example, the first component $m_0$ of the message m) are decoded at a time, the decoding apparatus permits errors to be included in the decoded bits. Furthermore, the decoding apparatus according to the one example embodiment determines in parallel whether the decoded plurality of bits include any error or not. According to the one embodiment, every L bits are decoded at a time to enable the number of decoding operations to be reduced to approximately K/L. Moreover, determination of whether any error is present in the decoded bits or not can be processed in a calculation time for about one bit by parallel calculation using L processors. Consequently, the one example embodiment enables the decoding process with the trapdoor function to be executed significantly faster than Non-Patent Literature 1.

The decoding method in the one example embodiment will be described below in further detail.

For "Error Correction (Steps A1 to A3) in Non-Patent Literature 1", describing only the decoding method for the first component $m_0$ of the message m suffices. For a similar reason, for the one example embodiment of the present invention, only the decoding method for the first component $m_0$ will be described. Moreover, for a vector:

$$\vec{b} = (b_0, \ldots, b_{NK-1}),$$

only the first K components ($b_0, \ldots, b_{K-1}$) related to the decoding of the first component $m_0$ of the message m is focused on.

First, a general configuration of a decoding process procedure in the one example embodiment will be described. A predetermined parameter L (L is a positive integer smaller than or equal to K) is hereinafter used.

The decoding process in Non-Patent Literature 1 includes a sequential decoding operation for each bit of the first component $m_0$.

On the other hand, the one example embodiment of the present invention replaces the error correction (steps A1 to A3) in the decoding process in Non-Patent Literature 1 with an operation based on "Error Correction (Steps B1 to B3)" briefly described below.

"Error Correction (Steps B1)": a plurality of bits (assumed to be L bits) constituting the first component $m_0$ are calculated at a time.

"Error Correction (Steps B2)": how many bits of L bits included in calculation results in step B1 are correct is determined.

"Error Correction (Steps B3)": The lowest of the digits determined to be erroneous in determination in step B2 is inverted, and the process returns to step B1.

Moreover, in the one example embodiment of the present invention, parallel calculation is used for the determination in the above-described step B2.

At this time, repetition of substantially K/L times of bit decoding operation allow decoding of all the bits (K bits) constituting the first component $m_0$. Accordingly, the one example embodiment enables the decoding process described in Non-Patent Literature 1 to be executed significantly faster.

The above-described decoding procedure will be described below in detail.

"Error Correction (Step B1)"

An operation of decoding a plurality of bits (L bits) at a time will be described. For the (K−L+1)-th component $b_{K-L}$ of the vector b, the following relationship is satisfied:

$$b_{K-L} = \frac{q}{2^L}(2^{L-1} m_{0,L-1} + \ldots + m_{0,0}) + \epsilon^-_{K-L}.$$

Here, component $\epsilon_{K-L}$ of the error vector is $$\epsilon_{K-L} \in \left(-\frac{q}{2^{L+1}}, \frac{q}{2^{L+1}}\right]$$

at a certain probability (at a relatively high probability when L is set to an appropriate value). In this case, the component $\epsilon_{K-L}$ of the error vector is assumed to be included within this range, and a plurality of bits $m_{0,0}, \ldots, m_{0,L-1}$ of the first component $m_0$ are estimated at a time from the component $b_{K-L}$ of the vector b. Here, an estimated value is denoted as $t_{new}$. In other words, $t_{new} = m_{0,0} + 2m_{0,1} + \ldots + 2^{L-1} m_{0,L-1}$ is set.

"Error Correction (Step B2)"

How many bits of the value $t_{new}$ estimated in "Error Correction (Step B1)" are correct is determined. Specifically, the determination is as follows.

For the (K−L+1)-th to K-th components b, (i=K−L, K−L+1, . . . , K−1) of the vector b, $b_i - 2^i t_{new}$ is calculated in parallel to define a flag $J_i$ as follows:

$$J_i \leftarrow \begin{cases} 1 & b_i - 2^i t_{new} \in \left(-\frac{q}{4}, \frac{q}{4}\right] \\ 0 & b_i - 2^i t_{new} \notin \left(-\frac{q}{4}, \frac{q}{4}\right] \end{cases}$$

Here, in a case where the flag $J_i$=1 for $b_i$ from $b_{K-I0}$ to $b_{K-1}$ (in other words, $I_0$ bits from the bit $m_{0,0}$ to the bit $m_{0,10-I}$ are correctly determined), $I_0$ is output (note that $I_0$ is also represented as I0). On the other hand, in a case where no i for which the flag $J_i$=1 is present (in other words, in a case where the flag $J_i$=0 for all i), $I_0$=0.

"Error Correction (Step B3)"

For the estimated value in "Error Correction (Step B1)", a correct decoded value is calculated as follows based on the determination in "Error Correction (Step B2)". For $I_0 \neq L$, the ($I_0$+1)-th bit $m_{0,I0}$ of $t_{new}$ is inverted and ($I_0$+1) bits from a lower bit of the $t_{new}$ are output as t. On the other hand, for $I_0$=L, $t_{new}$ is directly output as t.

"Error Correction (Step B4)"

For the next decoding, operations similar to the operations from "Error Correction (Step B1)" to "Error Correction (Step B3)" are performed. Specifically, the following calculation is executed. When the number of bits of t is represented as |t|, the next L bits ($b_{K-|t|-L}, \ldots, b_{K-|t|-1}$) of the vector b are focused on. For the (K−|t|−L+1)-th component $b_{K-|t|-L}$ of the vector b, the relationship is satisfied:

$$b_{K-|t|-L} = 2^{K-|t|-L_t} = \frac{q}{2^L}(2^{L-1} m_{0,|t|+L-1} + \ldots + m_{0,|t|}) + \epsilon^-_{K-|t|-L}.$$

Thus, the component $\epsilon_{K-|t|-L}$ of the error vector is $$\epsilon_{K-|t|-L} \in \left(-\frac{q}{2^{L+1}}, \frac{q}{2^{L+1}}\right]$$

at a certain probability (at a relatively high probability when L is set to an appropriate value). Thus, the component $\epsilon_{K-|t|-L}$ of the error vector is assumed to be included within this range, and the (|t|+1)-th bit $m_{0,|t|}$ to the (L+|t|)-th bit $m_{0,L+|t|-1}$ of the first component $m_0$ are estimated at a time to obtain the estimated result as $t_{new}$, based on the component $\epsilon_{K-|t|-L}$ of the vector b.

The procedure executed in the above-described "Error Correction (Step B2)" and "Error Correction (Step B3)" is performed on the estimated $t_{new}$ and ($b_{K-|t|-L}, \ldots, b_{K-|t|-1}$). Specifically, $b_i - 2^i t_{new}$ is calculated in parallel for the (K−|t|−L+1)-th to (K−|t|)-th components b, (i=K−|t|−L, . . . , K−|t|−1) of the vector b to define the flag $J_i$ as follows:

$$J_i \leftarrow \begin{cases} 1 & b_i - 2^i t_{new} \in \left(-\frac{q}{4}, \frac{q}{4}\right] \\ 0 & b_i - 2^i t_{new} \notin \left(-\frac{q}{4}, \frac{q}{4}\right] \end{cases}$$

Here, in a case where the flag $J_i$=1 for $b_i$ from $b_{K-|t|-I0}$ to $b_{K-|t|-1}$ (in other words, $I_0$ bits from the bit $m_{0,|t|}$ to the bit $m_{0,|t|+I0-1}$ are correctly determined), $I_0$ is output. On the other hand, in a case where no i for which the flag $J_i=1$ is present (in other words, in a case where the flag $J_i=0$ for all i), $I_0=0$.

For $I_0 \neq L$, the $(|t|+I_0+1)$-th bit $m_{0,|t|+I0}$ of $t_{new}$ is inverted and $(|t|I_0+1)$ bits from a lower bit of $t_{new}$ are output as t. On the other hand, for $I_0=L$, $t_{new}$ is directly output as t.

"Error Correction (Step B5)"

"Error Correction (Step B4)" is repeated until the number of bits of t determined in "Error Correction (Step B4)" is larger than (K−L).

"Error Correction (Step B6)"

From "Error Correction (Step B1)" to "Error Correction (Step B5)", every L bits are decoded at a time for the first component $m_0$ of the message m. On the other hand, in a case where, for the first component $m_0$, the number of remaining bits of the K bits to be decoded is smaller than or equal to (L−1), the remaining bits (L−1 bits or less) are decoded at a time. Specifically, the decoding is performed as follows.

The remaining (K−|t|) bits ($b_0, \ldots, b_{K-|t|-1}$) of the vector b are focused on. For the first component $b_0$ of the vector b, the following relationship is satisfied:

$$b_0 - 2^0 t = \frac{q}{2^{K-|t|}}(2^{K-|t|-1}m_{0,K-1} + \ldots + m_{0,|t|}) + \epsilon_0^-.$$

Here, the component $\epsilon_0$ of the error vector is $$\epsilon_0 \in \left(-\frac{q}{2^{K-|t|+1}}, \frac{q}{2^{K-|t|+1}}\right]$$

at a certain probability (at a relatively high probability in accordance with the value of (K−|t|)). Thus, the component $\epsilon_0$ of the error vector is assumed to be included within this range, and the $(|t|+1)$-th bit $m_{0,|t|}$ to the K-th bit $m_{0,K-1}$ of the first component $m_0$ are estimated to obtain the estimated result as $t_{new}$, based on the component $b_0$ of the vector b. The procedure in the above-described "Error Correction (Step B4)" is executed on the estimated $t_{new}$ and ($b_0, \ldots, b_{K-|t|-1}$).

Specifically, $b_i - 2^i t_{new}$ is calculated in parallel for the first to (K−|t|)-th components $b_i$ (i=0, ..., K−|t|−1) of the vector b to define the flag $J_i$ as follows:

$$J_i \leftarrow \begin{cases} 1 & b_i - 2^i t_{new} \in \left[-\frac{q}{4}, \frac{q}{4}\right) \\ 0 & b_i - 2^i t_{new} \notin \left[-\frac{q}{4}, \frac{q}{4}\right) \end{cases}.$$

Here, in a case where the flag $J_i=1$ for $b_i$ from $b_{K-|t|-I0}$ to $b_{K-|t|-1}$ (in other words, $I_0$ bits from the bit $m_{0,|t|}$ to the bit $m_{0,|t|+I0-1}$ are correctly determined), $I_0$ is output. On the other hand, in a case where no i for which the flag $J_i=1$ is present (in other words, in a case where the flag $J_i=0$ for all i), $I_0=0$.

For $I_0 \neq K-|t|$, the $(|t|+I_0+1)$-th bit $m_{0,|t|+I0}$ of $t_{new}$ is inverted, and $(|t|+I_0 1)$ bits from a lower bit of $t_{new}$ are output as t. On the other hand, for $I_0=K-|t|$, $t_{new}$ is directly output as t.

In a case where the number of bits of the thus determined t is K, t is directly output. On the other hand, in a case where the number of bits of the resultant t is less than K, decoding is sequentially executed on a bit-by-bit basis in accordance with "Error Correction (Steps A1 to A3) in Non-Patent Literature 1" until the number of bits of t is equal to K.

The above-described method enables the decoding process to be executed on all the bits (K bits) of the first component $m_0$ of the message m.

According to the one example embodiment, every L bits are collectively decoded to enable a reduction in the number of repetitions of sequential bit decoding operations as in "Error Correction (Steps A1 to A3) in Non-Patent Literature 1".

[Effects]

According to the one example embodiment, in decoding with the trapdoor function, a plurality of bits are collectively decoded and the decoding results are checked by parallel processing, enabling a faster decoding process.

This is because, whereas the method described in Non-Patent Literature 1 involves bit-by-bit sequential processing, the one example embodiment involves collective decoding of L bits in one loop in combination with the error check on the decoding results to allow the decoding to be achieved by substantially K/L sequential processes. The method in Non-Patent Literature 1 leads to substantially no errors in the results of the sequential decoding. On the other hand, according to the one example embodiment, a decoded value is collectively estimated for every L bits, possibly leading to occurrence of errors at a non-negligible probability. The error check is used to detect the errors. Here, the error check adopted in the one example embodiment is a method that can be performed independently on a bit-by-bit basis and in parallel. The error check involves identifying the bit of a bit sequence for which an error is detected first when checked from the lower side.

In a case where the error check is executed in parallel using L calculation units, the process can be achieved substantially in a processing time needed to decode one bit according to the method described in Non-Patent Literature 1. Consequently, according to the one example embodiment, the total time for the decoding calculation including the error check can be reduced down to the time needed to decode K/L bits by the method in Non-Patent Literature 1.

Example Embodiment 1

Now, a decoding apparatus according to a first example embodiment will be described in detail with reference to the drawings.

[Configuration]

Figure 2:
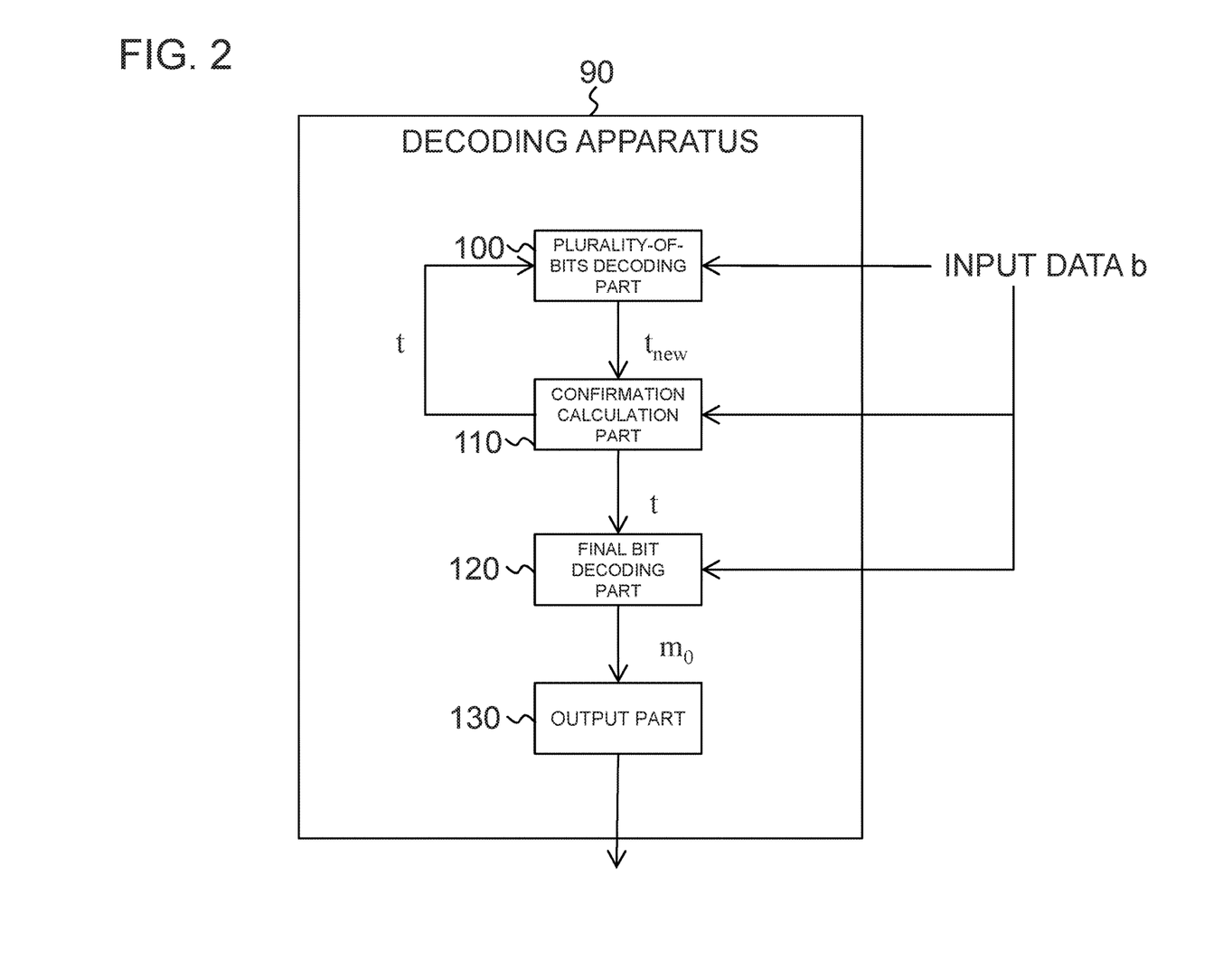
FIG. 2 is a block diagram illustrating an example of a configuration of a decoding apparatus according to a first example embodiment.

As seen in FIG. 2, a decoding apparatus 90 of the present example embodiment includes the plurality-of-bits decoding part 100, the confirmation calculation part 110, a final bit decoding part 120, and an output part 130. The decoding apparatus 90 can be implemented by, for example, a computer (or an information processing apparatus) operating under program control.

Here, a symbol:

$$N \in \mathbb{Z}$$

denotes a security parameter, and the following parameter is used.

$$K \in \mathbb{N}, q = 2^K, \sigma = \omega(\sqrt{\log N}),$$

$$\alpha\left(\text{number satisfying} \frac{1}{\alpha} > \sigma \cdot \omega(\sqrt{\log N})\right),$$

$$\overline{M} = O(NK), M = \overline{M} + NK$$

A matrix G is assumed to represent a primitive lattice matrix described in BACKGROUND ART. Moreover, a matrix R is represented by $$R = [\vec{r}_1, \ldots, \vec{r}_{NK}]$$

using $$\vec{r}_1 \leftarrow D_{\overline{ZM}, \sigma}, \ldots, \vec{r}_{NK} \leftarrow D_{\overline{ZM}, \sigma},$$

Here, $$D_{\overline{ZM}, \sigma},$$

denotes a discrete Gaussian distribution described in BACKGROUND ART.

Input data (input vector) input to the decoding apparatus 90:

$$\vec{b} = (b_0, \ldots, b_{NK-1}) \in \mathbb{Z}_q^{NK}$$

(hereinafter also denoted as b) is represented as follows. Specifically, an input vector b is represented by $$\vec{b} = mG + e(_I^{-R})$$

using a vector corresponding to a message:

$$\vec{m} = (m_0, \ldots, m_{N-1}) \in \mathbb{Z}_q^N$$

(hereinafter also denoted as m) and a vector e generated from the discrete Gaussian distribution:

$$D_{\{\mathbb{Z}^M, \alpha q\}}$$

As seen in FIG. 2, the input vector b is input to each of the plurality-of-bits decoding part 100, the confirmation calculation part 110, and the final bit decoding part 120.

Each component $m_i$ (i=0, ..., N−1) of the message $m=(m_0, \ldots, m_{N-1})$ is decoded using a similar procedure. Accordingly, only decoding of the first component $m_0$ of the message m will be described below.

Here, the first component $m_0$ of the message m is assumed to be represented by $$m_0 = 2^0 m_{0,0} + 2^1 m_{0,1} + 2^2 m_{0,2} + \ldots + 2^{K-1} m_{0,K-1}$$

when expanded into bits.

The plurality-of-bits decoding part 100 decodes a plurality of bits (for example, L bits) of the first component $m_0$ at a time as in "Error Correction (Step B1)" and "Error Correction (Step B4)" described above. The confirmation calculation part 110 references the data ($t_{new}$) decoded by the plurality-of-bits decoding part 100 and the given data (input vector b) to determine the number of bits correctly decoded and generate data including the correctly decoded bits, as in "Error Correction (Step B2)" to "Error Correction (Step B4)" described above. The final bit decoding part 120 decodes data that has not been completely decoded as in "Error Correction (Step B6)" described above. The output part 130 outputs decoding results.

Figure 3:
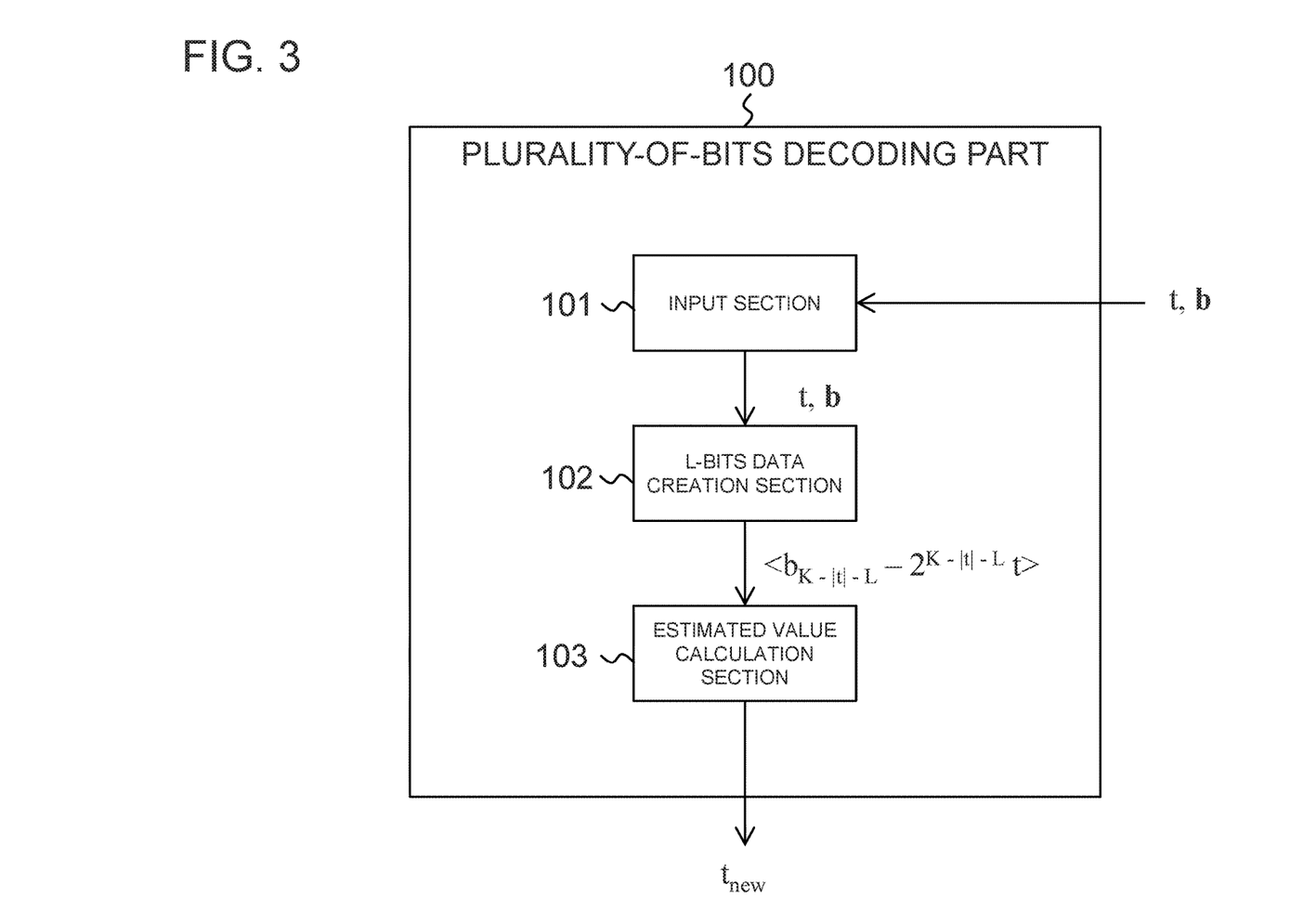
FIG. 3 is a block diagram illustrating an example of a configuration of a plurality-of-bits decoding part in the decoding apparatus of the first example embodiment.

As seen in FIG. 3, the plurality-of-bits decoding part 100 includes an input section 101, an L-bits data creation section 102, and an estimated value calculation section 103. The input section 101 receives, as input data, the correctly decoded data t in the first component $m_0$ and the input vector b. The L-bits data creation section 102 executes preliminary calculation for the process of calculating an estimated value in "Error Correction (Step B4)", to generate data used for estimation. In other words, the L-bits data creation section obtains, for the (K−|t|−L+1)-th component $b_{K-|t|-L}$ of the vector b, $$b_{K-|t|-L} = 2^{K-|t|-L_t} = \frac{q}{2^L}(2^{L-1} m_{0,|t|+L-1} + \ldots + m_{0,|t|}) + \bar{\epsilon}_{K-|t|-L}.$$

The estimated value calculation section 103 estimates, from the data calculated by the L-bits data creation section 102, L bits from the (|t|+1)-th bit $m_{0,|t|}$ to the (L+|t|)-th bit $m_{0,L+|t''|-1}$ of the first component $m_0$ to obtain the estimated result as $t_{new}$. The estimated value calculation section 103 outputs the estimated $t_{new}$ to the confirmation calculation part 110.

Figure 4:
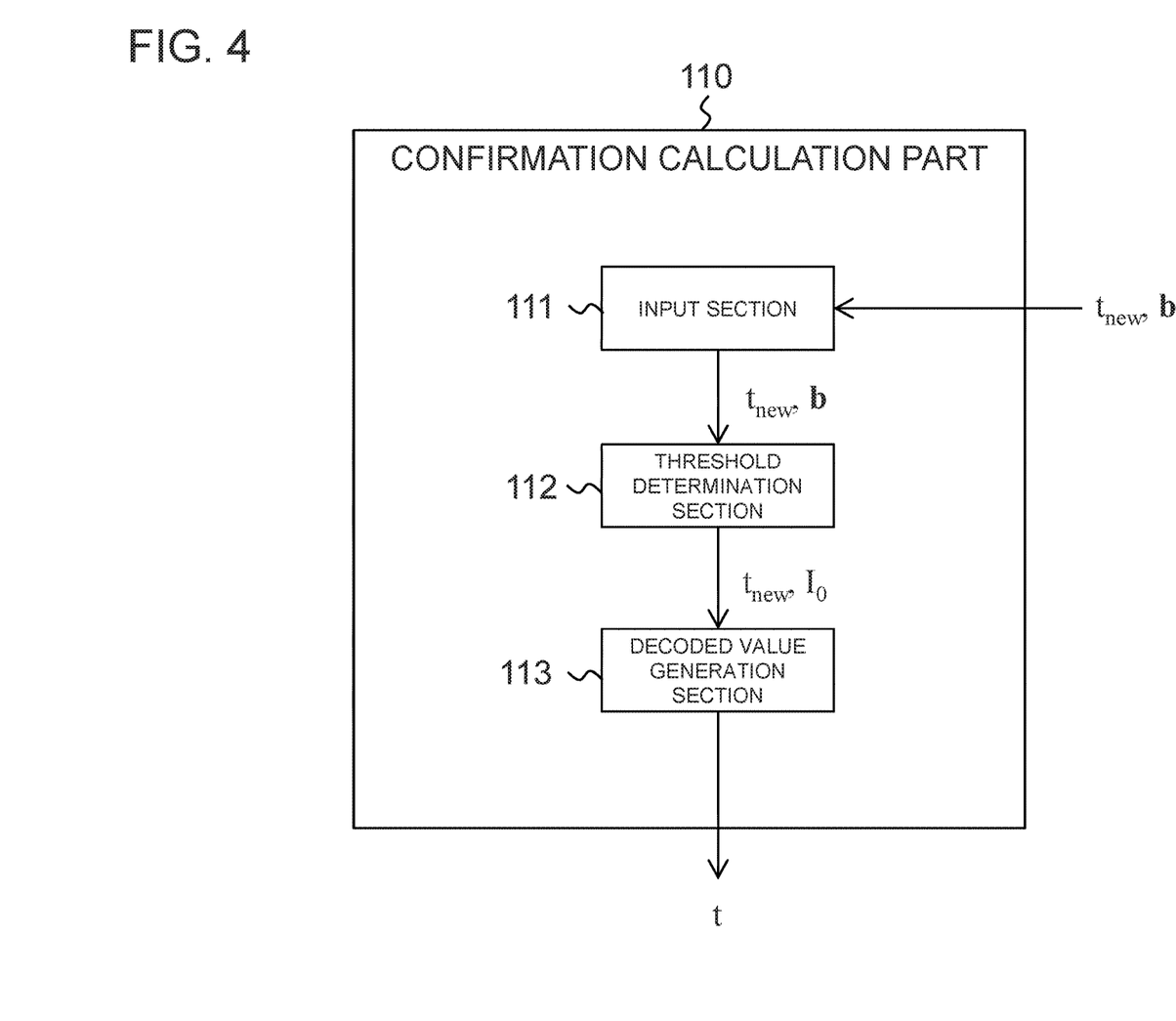
FIG. 4 is a block diagram illustrating an example of a configuration of a confirmation calculation part in the decoding apparatus of the first example embodiment.

As seen in FIG. 4, the confirmation calculation part 110 includes an input section 111, a threshold determination section 112, and a decoded value generation section 113. The input section 111 receives, as input data, $t_{new}$ estimated by the estimated value calculation section 103 and the input vector b. The threshold determination section 112 executes the processes of above-described "Error Correction (Step B2)" and "Error Correction (Step B4)" to determine how many bits of the estimated L bits are correct and calculate the number $I_0$ of correctly obtained bits. The decoded value generation section 113 executes the processes of above-described "Error Correction (Step B3)" and "Error Correction (Step B4)" to generate a correct decoded value t, based on the result of determination by the threshold determination section 112. In a case where the number of bits of the decoded value t is larger than (K−L) (in other words, the number of non-decoded bits is smaller than or equal to (L−1)), the decoded value generation section 113 outputs the decoded value t to the final bit decoding part 120. Otherwise the decoded value generation section 113 outputs the decoded value t to the plurality-of-bits decoding part 100.

Figure 5:
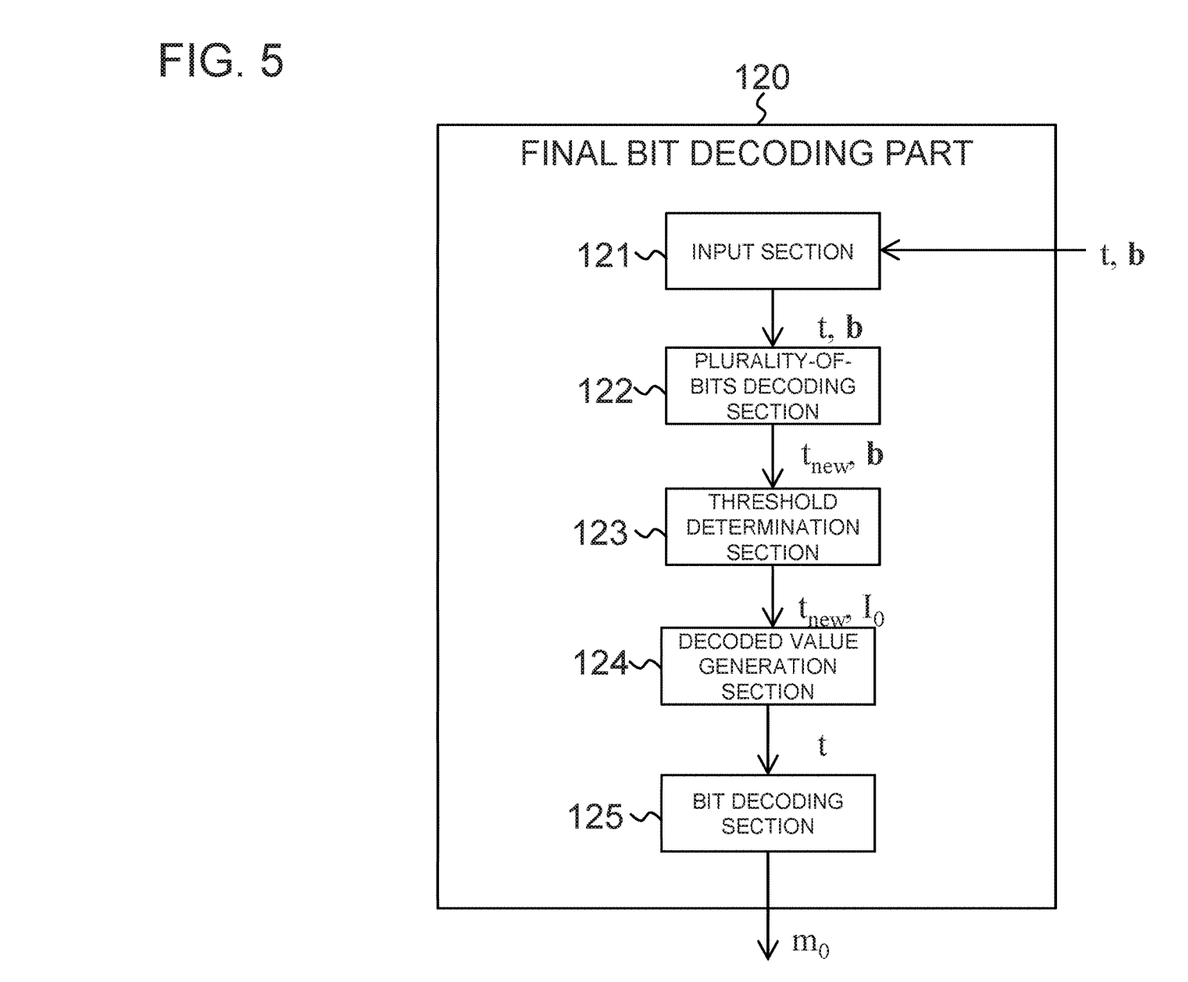
FIG. 5 is a block diagram illustrating an example of a configuration of a final bit decoding part in the decoding apparatus of the first example embodiment.

As seen in FIG. 5, the final bit decoding part 120 includes an input section 121, a plurality-of-bits decoding section 122, a threshold determination section 123, a decoded value generation section 124, and a bit decoding section 125. The input section 121 receives, as input data, the decoded value t generated by the decoded value generation section 113 and the input vector b. The plurality-of-bits decoding section 122 decodes remaining bits at a time as described in "Error Correction (Step B6)". The threshold determination section 123 determines how many bits of the decoded bits are correct. The decoded value generation section 124 calculates a correct decoded value based on the result of determination by the threshold determination section 123. The bit decoding section 125 sequentially decodes the remaining bits.

[Operation]

Now, operation of the decoding apparatus 90 of the present example embodiment and each component will be described with reference to a flowchart in FIG. 6.

Based on already correctly decoded data t, the L-bits data creation section 102 creates data:

$$b_{K-|t|-L} - 2^{K-|t|-L} t$$

that is needed to estimate a decoded value for the next L bits, and delivers the created data to the estimated value calculation section 103. Here, |t| denotes the number of bits of the data t.

Figure 6:
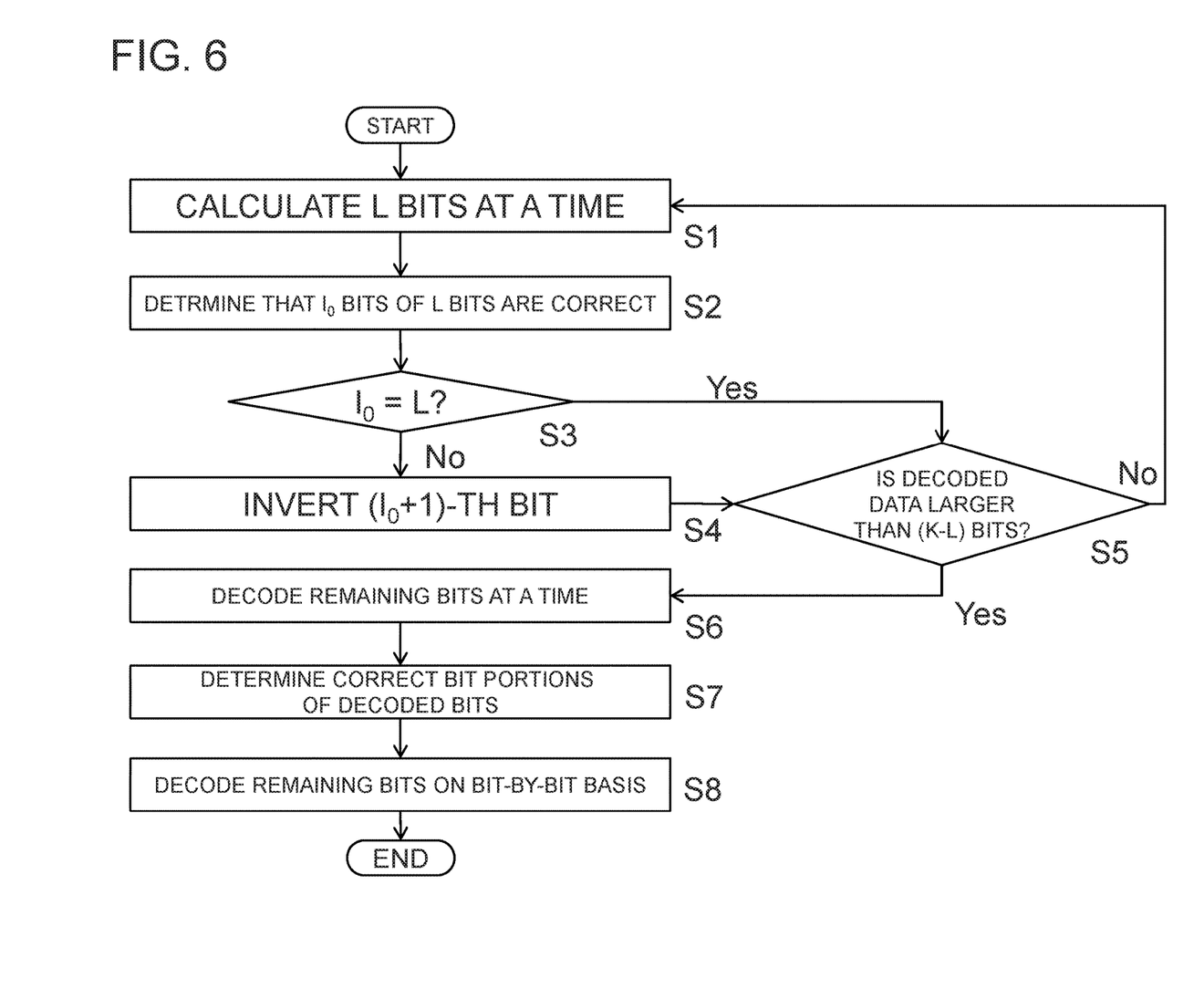
FIG. 6 is a flowchart illustrating operation of the decoding apparatus according to the first example embodiment.
Figure 7:
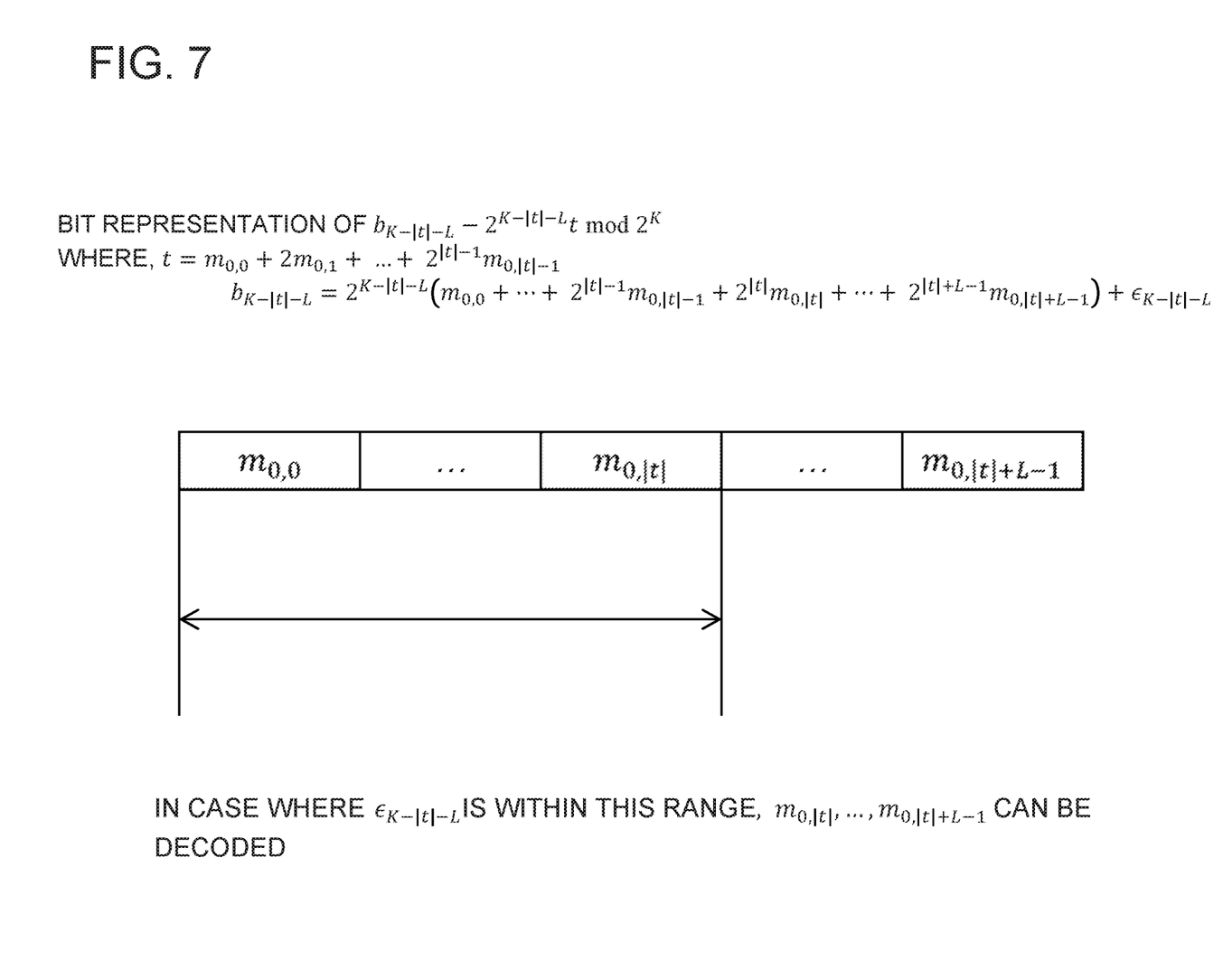
FIG. 7 is a diagram illustrating a procedure of an estimated value calculation section in the plurality-of-bits decoding part.

The estimated value calculation section 103 uses bit shift to collectively estimate and decode L bits from a higher bit of $b_{K-|t|-L} - 2^{K-|t|-L} t$ to calculate an estimated value $t_{new}$ for bits to (|t|+L)-th bit (step S1 in FIG. 6). Specifically, the estimated value calculation section 103 assumes that the components $\epsilon_{K-|t|-L}$ of the error vector are included within a predetermined range (FIG. 7), and estimates the (|t|+1)-th bit $m_{0,|t|}$ to the (L+|t|)-th bit $m_{0,L+|t|-1}$ of the first component $m_0$ to obtain $t_{new}$, as in "Error Correction (Step B4)"

described above. Moreover, the estimated value calculation section 103 outputs the calculated estimated value $t_{new}$ to the input section 111 of the confirmation calculation part 110 (FIG. 3 and FIG. 4).

Figure 8:
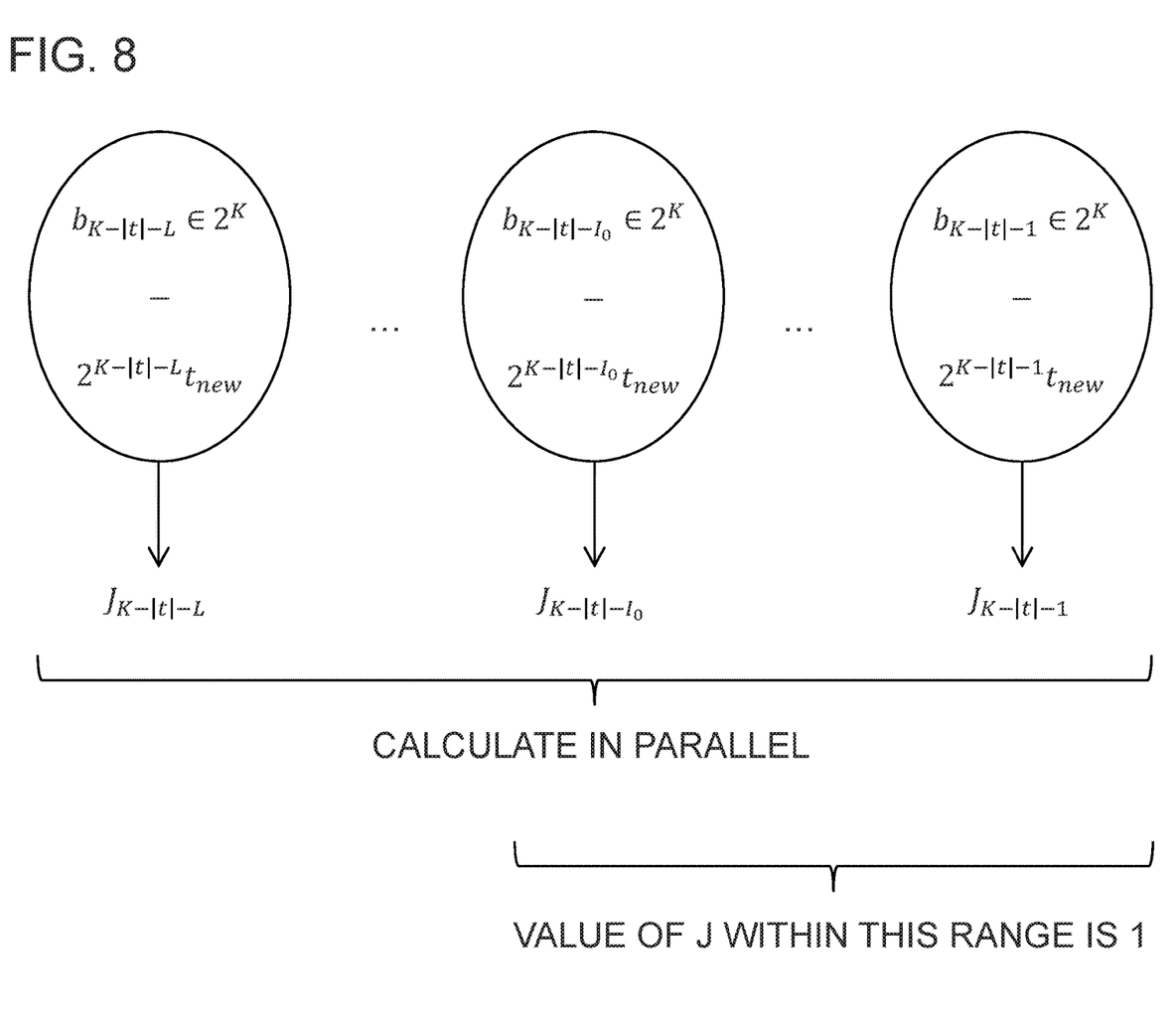
FIG. 8 is a diagram illustrating a procedure for a threshold determination section in the confirmation calculation part.

The input section 111 of the confirmation calculation part 110 receives $t_{new}$ and the input vector b as input data. The threshold determination section 112 of the confirmation calculation part 111 calculates $b_i - 2^i t_{new}$ for each of the (K−|t|−L+1)-th to the (K−|t|)-th components $b_i$ of the input vector b in parallel and determines, for each i and in parallel, whether the result is within a range [−q/4, q/4) or not. The threshold determination section 112 determines the maximum $I_0$ within $I_0$ that satisfy a condition ($b_i - 2^i t_{new} \in [-q/4, q/4)$) for all i<$I_0$ (step S2 in FIG. 6, FIG. 8). Note that, in a case where no i that satisfies such a condition is present, $I_0$=0 is set. Moreover, the threshold determination section 112 delivers $t_{new}$ and $I_0$ to the decoded value generation section 113.

The decoded value generation section 113 receives the data $t_{new}$ and $I_0$ from the threshold determination section 123. For $I_0 \neq L$ (No in step S3 in FIG. 6), the decoded value generation section 113 inverts the (|t|+$I_0$+1)-th bit of $t_{new}$ and outputs the (|t|+$I_0$+1) bits of $t_{new}$ as t (step S4 in FIG. 6). On the other hand, for $I_0$=L (Yes in step S3 in FIG. 6), the decoded value generation section 113 directly outputs $t_{new}$ as t.

Here, the decoded value generation section 113 selects an output destination of t as described below. In a case where the number of bits of t is larger than (K−L) (Yes in step S5 in FIG. 6), the decoded value generation section 113 delivers t to the final bit decoding part 120 (FIG. 2). On the other hand, in a case where the number of bits of t is smaller than or equal to (K−L) (No in step S5 in FIG. 6), the decoded value generation section 113 delivers t to the plurality-of-bits decoding part 100 (FIG. 2).

The input section 121 of the final bit decoding part 120 receives the data b and t from the decoded value generation section 113 (see FIG. 5). The plurality-of-bits decoding section 122, the threshold determination section 123, and the decoded value generation section 124 of the final bit decoding part 120 respectively execute procedures similar to the procedures executed by the plurality-of-bits decoding part 100 (see FIG. 3), and the threshold determination section 112 and the decoded value generation section 113 of the confirmation calculation part 110 (see FIG. 4).

In other words, the plurality-of-bits decoding section 122 executes a process similar to the process executed by the plurality-of-bits decoding part 100 to decode the remaining (K−|t|) bits (less than L bits) at a time (step S6 in FIG. 6). Specifically, the plurality-of-bits decoding section 122 estimates the (|t|+1)-th bit $m_{0,|t|}$ to the K-th bit $m_{0,K−1}$ of the first component $m_0$ to obtain the estimated result as $t_{new}$, as in "Error Correction (Step B6)" described above.

Moreover, the threshold determination section 123 executes a process similar to the process executed by the threshold determination section 112 of the confirmation calculation part 110 to determine a correct bit portion of the decoded value estimated by the plurality-of-bits decoding section 122 (step S7 in FIG. 6). Specifically, the threshold determination section 123 executes the procedure in "Error Correction (Step B4)" described above, on $t_{new}$ estimated by the plurality-of-bits decoding section 122 and the components ($b_0, \ldots, b_{K−|t''|−1}$) of the input vector b to determine the correct bit portion, and outputs determined $I_0$ to the decoded value generation section 124.

Furthermore, the decoded value generation section 124 executes a process similar to the process executed by the decoded value generation section 113 of the confirmation calculation part 110 (FIG. 4) to generate a correct decoded value t, based on the result of determination by the threshold determination section 123. Specifically, the decoded value generation section 124 executes the procedure in "Error Correction (Step B4)" described above to invert, for $I_0 \neq K−|t|$, the (|t|+$I_0$+1)-th bit $m_{0,|t|+I0}$ of $t_{new}$ and output the (|t|+$I_0$+1) bits of $t_{new}$ to the bit decoding section 125 as t. On the other hand, for $I_0$=K−|t|, the decoded value generation section 124 outputs $t_{new}$ to the bit decoding section 125 as t.

For |t|≠K, the bit decoding section 125 uses the procedure in "Error Correction (Steps A1 to A3)" in Non-Patent Literature 1" to sequentially decode the remaining (K−|t|) bits to complete decoding all the bits (K bits) of the first component $m_0$ (step S8 in FIG. 6).

[Effects]

According to the present example embodiment, in decoding with the trapdoor function, a plurality of bits constituting a message are collectively decoded and the decoding results are checked for errors by parallel processing, enabling a decoding process faster than the decoding process described in Non-Patent Literature 1.

This is because the present example embodiment involves collective decoding of L bits in one loop (in other words, a loop between the plurality-of-bits decoding part 100 in FIG. 2, a loop from step S1 to step S5 in FIG. 6) in combination with the error check on the decoding results based on parallel processing to allow all the bits of the message to be decoded by substantially K/L sequential processes.

Modification

Now, a modification of the decoding apparatus 90 according to the above-described example embodiment will be described. The decoding apparatus 90 according to the above-described example embodiment may be implemented based on the information processing apparatus 80 illustrated in FIG. 9.

Figure 9:
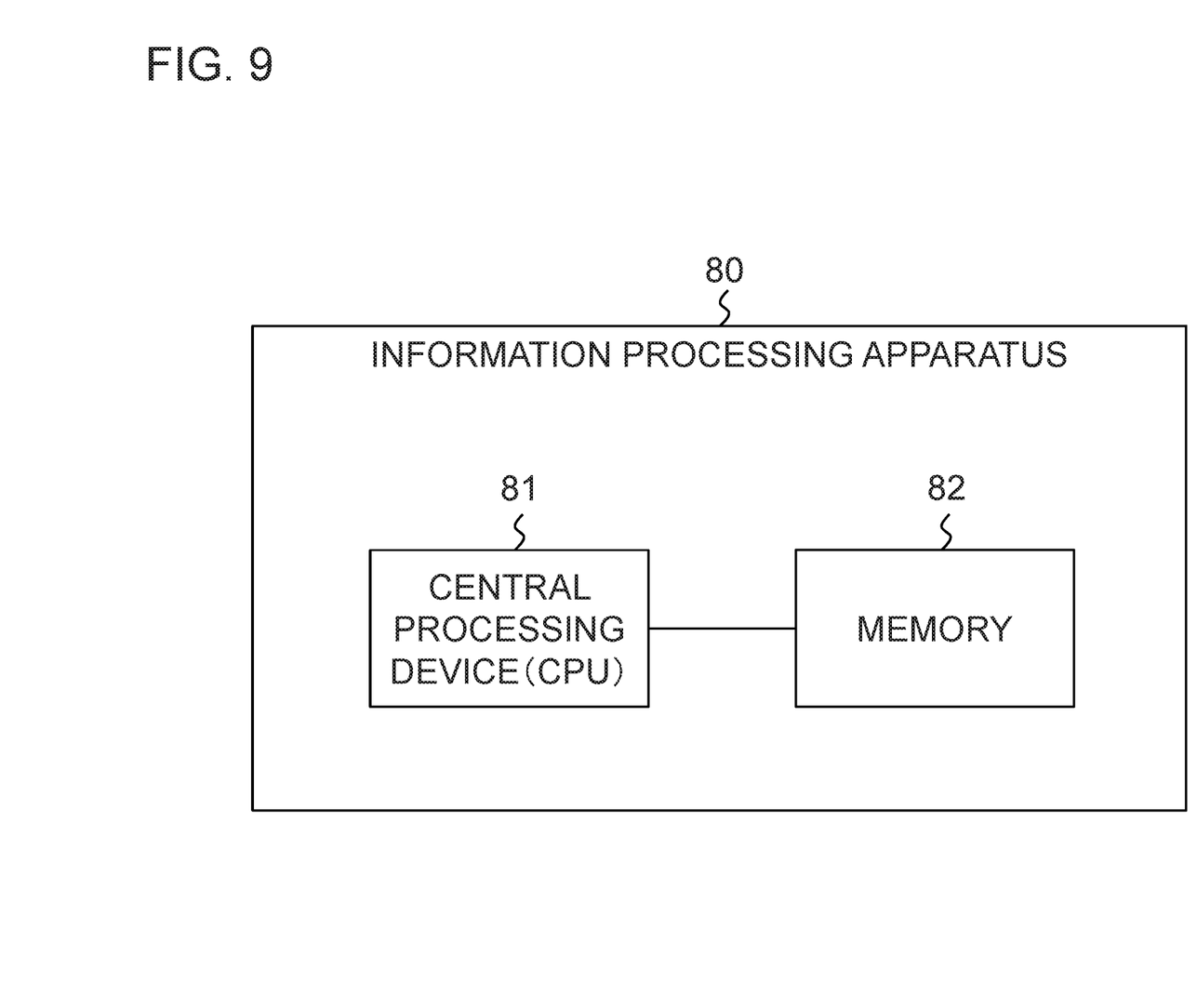
FIG. 9 is a block diagram illustrating an example of a configuration of an information processing apparatus.

The information processing apparatus 80 includes a central processing device (central processing unit: CPU) 81 and a memory 82. FIG. 9 illustrates only one CPU 81, but the information processing apparatus 80 may include a plurality of CPUs (multiprocessor) or include a multicore processor with a plurality of arithmetic cores mounted on one chip.

In the information processing apparatus 80, the CPU 81 executes a program stored in the memory 82 to implement some or all of the functions of the plurality-of-bits decoding part 100, the confirmation calculation part 110, the final bit decoding part 120, and the output part 130 of the decoding apparatus 90. In particular, a plurality of CPUs or a plurality of arithmetic cores are used to execute the determination processes (step S2 in FIG. 6) of the threshold determination section 112 of the confirmation calculation part 110 (FIG. 4) and the determination processes (step S7 in FIG. 6) of the threshold determination section 123 of the final bit decoding part 120 (FIG. 5) in parallel. This enables a faster decoding process than in Non-Patent Literature 1.

Note that all the contents disclosed in Patent Literature 1 and Non-Patent Literature 1 are incorporated and described herein by reference. Making a change and adjustment of the example embodiments is allowed within the framework of the entire disclosure (including the scope of the claims) of the present invention, and also based on a basic technical concept of the present invention. Furthermore, various combination or selection of various disclosed elements (including each element of each claim, each element of each example embodiment, each element of each drawing, and the like) is allowed within the framework of the entire disclosure of the present invention. Specifically, as a matter of course, the present invention encompasses various modifications and amendments that may be achieved by a person skilled in the art based on the entire disclosure including the scope of the claims and the technical concept. Regarding a numerical range described herein, in particular, it should be interpreted that any numerical value or any smaller range included within the range is specifically described even without particular description.

REFERENCE SIGNS LIST

80 Information processing apparatus
81 CPU
82 Memory
90 Decoding apparatus
100 Plurality-of-bits decoding part
101 Input section
102 L-bits data creation section
103 Estimated value calculation section
110 Confirmation calculation part
111 Input section
112 Threshold determination section
113 Decoded value generation section
120 Final bit decoding part
121 Input section
122 Plurality-of-bits decoding section
123 Threshold determination section
124 Decoded value generation section
125 Bit decoding section
130 Output part

What is claimed is:

1. A decoding apparatus comprising:
a plurality of processors; and
a memory in circuit communication with the plurality of processors,
wherein the plurality of processors is configured to execute program instructions stored in the memory to implement:
a plurality-of-bits decoding part configured to
receive an input vector obtained by adding a message encrypted by a trapdoor function and an error vector including an element(s) conforming with a discrete Gaussian distribution, and
decode a plurality of bits from a lower bit of the message based on the input vector in correctness with a predetermined probability; and
a confirmation calculation part configured to determine whether the decoded plurality of bits are correct or not by using the plurality of processors in parallel,
wherein the message is encrypted by taking an inner product with a vector including a power of two as an element(s).

2. The decoding apparatus according to claim 1, wherein the confirmation calculation part determines whether the decoded plurality of bits are correct or not, based on an allowable range of a value taken by the element(s) included in the error vector.

3. The decoding apparatus according to claim 1, wherein the confirmation calculation part determines how many bits, from a lower bit, of the decoded plurality of bits are correct.

4. The decoding apparatus according to claim 3, wherein the confirmation calculation part inverts a lowest bit of bits included in the decoded plurality of bits and determined to be erroneous, and
the plurality-of-bits decoding part decodes, among the bits constituting the message, a plurality of higher bits from one bit higher than the lowest bit, based on the input vector.

5. A decoding method performed by a computer that has a plurality of processors, the method comprising:
receiving an input vector obtained by adding a message encrypted by a trapdoor function and an error vector including an element(s) conforming with a discrete Gaussian distribution;
decoding a plurality of bits from a lower bit of the message based on the input vector in correctness with a predetermined probability; and
determining whether the decoded plurality of bits are correct or not by using the plurality of processors in parallel,
wherein the message is encrypted by taking an inner product with a vector including a power of two as an element(s).

6. The decoding method according to claim 5, wherein whether the decoded plurality of bits are correct or not is determined based on an allowable range of a value taken by the element(s) included in the error vector.

7. The decoding method according to claim 5, comprising:
determining how many bits, from a lower bit, of the decoded plurality of bits are correct.

8. The decoding method according to claim 7, comprising:
inverting a lowest bit of bits included in the decoded plurality of bits and determined to be erroneous, and
decoding, among the bits constituting the message, a plurality of higher bits from one bit higher than the lowest bit, based on the input vector.

9. A non-transitory computer readable medium storing a program causing a computer that has a plurality of processors to execute processes of:
receiving an input vector obtained by adding a message encrypted by a trapdoor function and an error vector including an element(s) conforming with a discrete Gaussian distribution;
decoding a plurality of bits from a lower bit of the message based on the input vector in correctness with a predetermined probability; and
determining whether the decoded plurality of bits are correct or not by using the plurality of processors in parallel,
wherein the message is encrypted by taking an inner product with a vector including a power of two as an element(s).

10. The non-transitory computer readable medium storing the program according to claim 9, wherein
whether the decoded plurality of bits are correct or not is determined based on an allowable range of a value taken by the element(s) included in the error vector.

11. The non-transitory computer readable medium storing the program according to claim 9, comprising:
determining how many bits, from a lower bit, of the decoded plurality of bits are correct.

12. The non-transitory computer readable medium storing the program according to claim 11, comprising:
inverting a lowest bit of bits included in the decoded plurality of bits and determined to be erroneous, and decoding, among the bits constituting the message, a plurality of higher bits from one bit higher than the lowest bit, based on the input vector.

* * * * *